(12) United States Patent
Noll et al.

(10) Patent No.: US 9,670,930 B2
(45) Date of Patent: Jun. 6, 2017

(54) CONSTRUCTION MACHINE WITH AUTOMATIC FAN ROTATIONAL SPEED REGULATION

(71) Applicant: JOSEPH VOGELE AG, Ludwigshafen/Rhein (DE)

(72) Inventors: Tobias Noll, Roschback (DE); Ralf Weiser, Ladenburg (DE); Thomas Riedl, Mannheim (DE)

(73) Assignee: JOSEPH VOGELE AG, Ludwigshafen/Rhein (DE)

( * ) Notice: Subject to any disclaimer, the term of this patent is extended or adjusted under 35 U.S.C. 154(b) by 162 days.

(21) Appl. No.: 13/647,587

(22) Filed: Oct. 9, 2012

(65) Prior Publication Data

US 2013/0089375 A1 Apr. 11, 2013

(30) Foreign Application Priority Data

Oct. 7, 2011 (EP) .................................... 11008136

(51) Int. Cl.
| | |
|---|---|
| *B60K 11/06* | (2006.01) |
| *B60K 11/00* | (2006.01) |
| *F04D 15/00* | (2006.01) |
| *E01C 19/00* | (2006.01) |
| *F04D 27/00* | (2006.01) |
| *E01C 19/48* | (2006.01) |

(52) U.S. Cl.
CPC .......... *F04D 15/0066* (2013.01); *E01C 19/00* (2013.01); *F04D 27/004* (2013.01); *E01C 19/48* (2013.01)

(58) Field of Classification Search
CPC ...... B60K 11/00; B60K 11/02; F01P 2037/00; F01P 2023/08; F01P 2025/60; F01P 2025/62; F01P 7/10; F01P 7/16
USPC .......................... 180/68.1; 123/41.11, 41.12
See application file for complete search history.

(56) References Cited

U.S. PATENT DOCUMENTS

| | | | |
|---|---|---|---|
| 4,124,001 A | 11/1978 | Samuel et al. | |
| 4,425,766 A * | 1/1984 | Claypole | .......................... 62/133 |
| 4,467,901 A | 8/1984 | Hattori et al. | |

(Continued)

FOREIGN PATENT DOCUMENTS

| | | |
|---|---|---|
| CN | 101936211 A | 12/2010 |
| DE | 10062534 A1 | 7/2001 |

(Continued)

OTHER PUBLICATIONS

Office Action mailed Aug. 21, 2013, which issued in corresponding U.S. Appl. No. 13/482,034.

(Continued)

*Primary Examiner* — J. Allen Shriver, II
*Assistant Examiner* — Travis Coolman
(74) *Attorney, Agent, or Firm* — Fish & Richardson P.C.

(57) ABSTRACT

The present invention relates to a construction machine with automatic fan rotational speed regulation. The construction machine includes at least one electric motor that is connected functionally to a respective fan and a control unit formed for the purpose of registering operation-specific data. The control unit is configured for the purpose of regulating, depending on the operation-specific data, an electric output of the respective electric motor in order to adjust a desired target fan rotational speed on the fan.

15 Claims, 1 Drawing Sheet

T CA   Charge air temperature
T H₂O  Cooling water temperature
T Hyd oil  Hydraulic oil temperature

(56) References Cited

U.S. PATENT DOCUMENTS

| | | | |
|---|---|---|---|
| 4,557,223 A * | 12/1985 | N Gueyen | 123/41.12 |
| 4,580,531 A * | 4/1986 | N'Guyen | 123/41.1 |
| 4,691,668 A * | 9/1987 | West | 123/41.12 |
| 4,765,284 A * | 8/1988 | Kanazawa et al. | 123/41.49 |
| 4,920,929 A | 5/1990 | Bishop | |
| 5,228,300 A | 7/1993 | Shim | |
| 5,609,125 A * | 3/1997 | Ninomiya | 123/41.12 |
| 5,855,266 A | 1/1999 | Cummings | |
| 5,947,189 A * | 9/1999 | Takeuchi et al. | 165/51 |
| 5,947,247 A | 9/1999 | Cummings | |
| 6,101,987 A * | 8/2000 | Saur et al. | 123/41.1 |
| 6,213,061 B1 * | 4/2001 | Bartolazzi et al. | 123/41.12 |
| 6,337,949 B1 | 1/2002 | Muron et al. | |
| 6,340,006 B1 * | 1/2002 | Malatto et al. | 123/41.29 |
| 6,346,789 B1 * | 2/2002 | Bird et al. | 318/480 |
| 6,349,882 B1 * | 2/2002 | Kita | F01P 7/044 236/34 |
| 6,453,853 B1 | 9/2002 | Hawkins et al. | |
| 6,463,891 B2 | 10/2002 | Algrain et al. | |
| 6,470,838 B2 * | 10/2002 | Ap et al. | 123/41.12 |
| 7,011,050 B2 * | 3/2006 | Suda et al. | 123/41.1 |
| 7,047,911 B2 | 5/2006 | Robb et al. | |
| 7,066,114 B1 * | 6/2006 | Hannesen et al. | 123/41.12 |
| 7,134,406 B1 | 11/2006 | Loes | |
| 7,165,514 B2 | 1/2007 | Bowman et al. | |
| 7,249,664 B2 | 7/2007 | Ignatovich et al. | |
| 7,341,026 B2 | 3/2008 | Laukemann | |
| 7,397,354 B1 * | 7/2008 | Easton | 340/449 |
| 7,421,984 B2 * | 9/2008 | Braun et al. | 123/41.29 |
| 7,455,239 B2 | 11/2008 | Braun et al. | |
| 7,516,827 B2 | 4/2009 | Pickelman et al. | |
| 7,921,816 B2 * | 4/2011 | Okuda | E02F 9/226 123/41.12 |
| 8,015,954 B2 * | 9/2011 | Kardos | 123/41.12 |
| 8,196,553 B2 * | 6/2012 | Kline et al. | 123/41.11 |
| 8,616,160 B2 * | 12/2013 | Suzuki | 123/41.12 |
| 2001/0025610 A1 | 10/2001 | Weber | |
| 2001/0029907 A1 | 10/2001 | Algrain et al. | |
| 2002/0066422 A1 * | 6/2002 | Hawkins et al. | 123/41.12 |
| 2003/0041814 A1 | 3/2003 | Laird et al. | |
| 2005/0081801 A1 | 4/2005 | Braun et al. | |
| 2008/0238607 A1 | 10/2008 | Schuricht et al. | |
| 2009/0155045 A1 * | 6/2009 | Chang et al. | 415/17 |
| 2010/0326067 A1 | 12/2010 | Weiser et al. | |
| 2011/0120426 A1 | 5/2011 | Back et al. | |

FOREIGN PATENT DOCUMENTS

| | | |
|---|---|---|
| EP | 1093943 A1 | 4/2001 |
| EP | 1528232 A1 | 5/2005 |
| EP | 2264294 A1 | 12/2010 |
| JP | 08177887 A | 7/1996 |
| JP | 2001-182535 A | 7/2001 |
| JP | 2002098245 A | 4/2002 |
| JP | 2001-200796 A | 1/2003 |
| JP | 2004068640 A | 3/2004 |
| JP | 2005214155 A | 8/2005 |
| JP | 2006105025 A | 4/2006 |
| JP | 2005-121028 A | 11/2006 |
| JP | 2007321622 A | 12/2007 |
| WO | 2005121588 A | 12/2005 |
| WO | 2007119318 A | 10/2007 |

OTHER PUBLICATIONS

Office Action which issued on May 27, 2014 in corresponding U.S. Appl. No. 13/482,034.

European Search Report mailed Mar. 8, 2012, which issued in corresponding EP Application No. 11008136.

European Search Report mailed Nov. 4, 2011, which issued in corresponding EP Application No. 11004512.

Office Action which issued on Oct. 28, 2014 in corresponding U.S. Appl. No. 13/482,034.

Office action which issued Feb. 16, 2015 in corresponding Chinese Application No. 201210180558.3, and English translation thereof.

Office Action which issued on Aug. 25, 2015 in corresponding Japanese Application No. 2012-123421, with English translation thereof.

Office Action which issued on Jan. 26, 2016 in corresponding Japanese Application No. 2012-222755, with English translation thereof.

Office Action dated Sep. 29, 2014 which issued in corresponding Chinese Patent Application No. 201210377930.X, with English translation thereof.

* cited by examiner

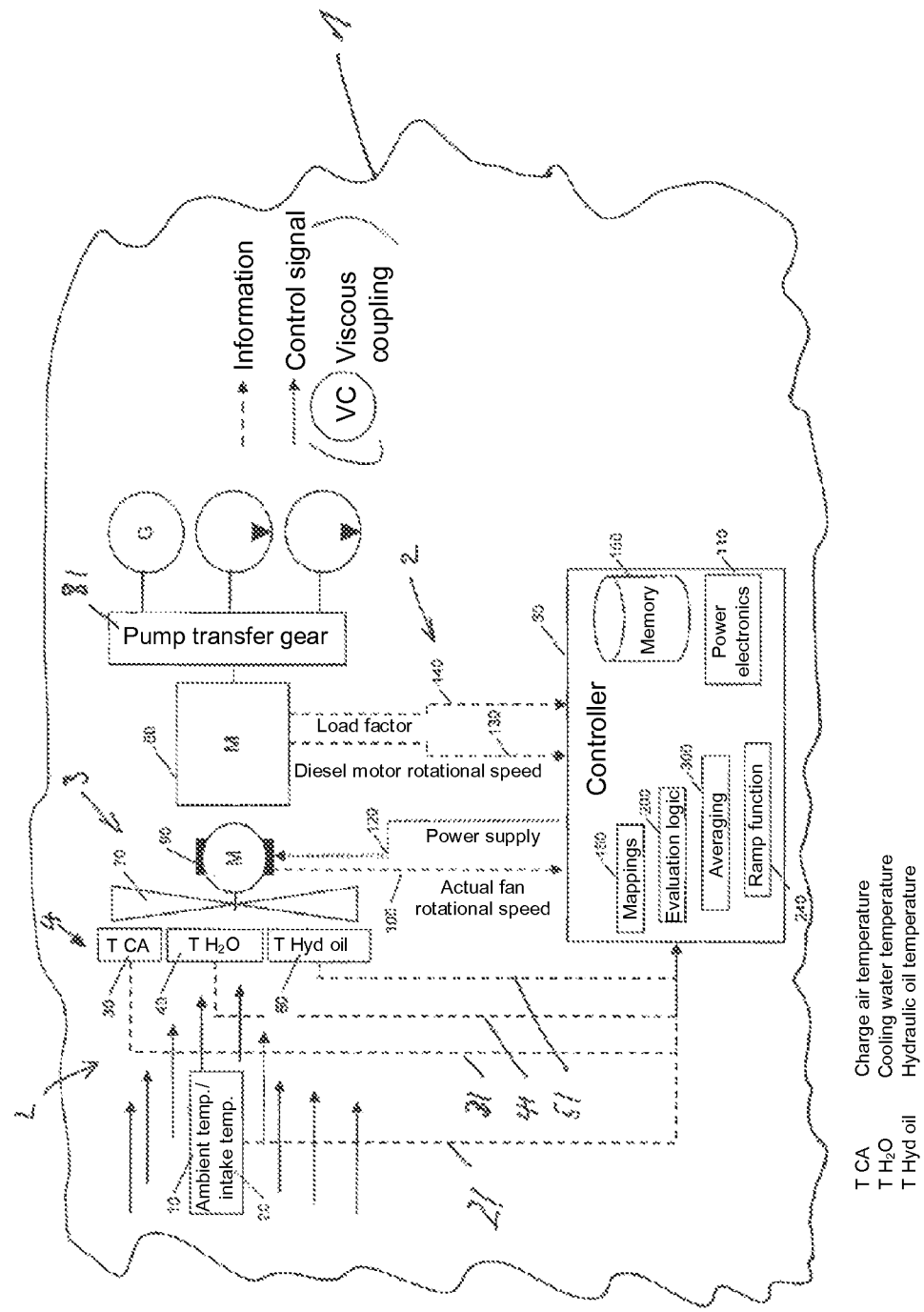

CONSTRUCTION MACHINE WITH AUTOMATIC FAN ROTATIONAL SPEED REGULATION

FIELD OF THE INVENTION

The present invention relates to a construction machine, particularly to a road paver or a feeder, with automatic fan rotational speed regulation, and to a method for the automatic regulation and control of a cooling system of a construction machine.

BACKGROUND OF THE INVENTION

In practical application, diesel motors are used as the main engines in road pavers. Both the diesel motors and the assemblies driven by them have, due to their degree of efficiency, thermal power loss that must be dissipated by a cooler in order to prevent the driven assemblies from overheating.

It is known that in current pavers, three working media, namely cooling water, charge air and hydraulic oil, are cooled to the required temperatures by means of heat exchangers. In order to ensure airflow through the heat exchangers, a fan is a component of the cooling system.

In the case of conventional road pavers, the fan is connected rigidly to the diesel motor so that the fan takes on an operating rotational speed equal to the diesel motor rotational speed at all times. This is detrimental because even in the case of a short-term rise in the diesel motor rotational speed, the fan likewise runs at a higher speed, as a result of which considerable noise can develop. Such synchronous operating performance of the ventilator is, however, not needed in practice, because the fan operation depends more on the required temperatures of the working media than on a need to be driven synchronously with the diesel motor rotational speed.

As an alternative to a rigid coupling of the fan to the diesel motor, in practice hydraulically driven fans are used on road pavers. This has the disadvantage, however, that hydraulic losses must be accepted in the fan drive. In addition, the financial expenditure increases enormously if one wants to optimise the degree of efficiency of a hydraulic fan drive.

OBJECTS OF THE INVENTION

The object of the invention is therefore to create a construction machine, particularly a road paver or a feeder, in which the provision of a cooling flow is adapted optimally to the operating conditions of the construction machine, whereby simple, economical instruments are used to do so. A method for improved regulation and control of a cooling system is another object of the invention.

These objects are achieved with the apparatus and methods of the present invention.

DETAILED DESCRIPTION OF THE INVENTION

The invention relates to a construction machine, particularly to a road paver or a feeder, with automatic fan rotational speed regulation. For this purpose, the construction machine comprises a drive unit, a control unit and a cooling unit that comprises at least one fan. The at least one fan is provided for the purpose of producing a cooling airflow. The cooling airflow is used, for example, for the purpose of cooling working media, principally cooling water, charge air and hydraulic oil, to a temperature required for the operation of the construction machine.

In particular, the control unit of the construction machine is configured for the purpose of registering operation-specific data. This is explained in more detail in the following.

According to the invention, the cooling unit of the construction machine comprises at least one regulatable electric motor that is connected functionally to the respective fan. The electric motor is provided to drive the fan in order that the fan produces the required cooling airflow in order to ensure corresponding cooling. Furthermore, according to the invention the control unit is configured for the purpose of regulating, depending on the operation-specific data, an electric output of the respective electric motor in such a manner that a desired target fan rotational speed can be adjusted on the fan.

As a result, the invention offers the technical advantage that regulation of the fan rotational speed of the construction machine can be carried out by an electric motor provided specially for this purpose or by a plurality of electric motors provided for this purpose in such a manner that a rigid coupling with the drive unit can be avoided. The use of the electric motor likewise offers an economical alternative to the use of hydraulic drives. On the basis of the electric motor used, maintenance and service costs in particular can thereby be reduced.

The regulation and control of the electric motor as needed by means of the control unit, depending on the operation-specific data, makes it possible to reduce the noise level during the operation of the construction machine. This is due to the fact that the fan is no longer, as in the case of conventional construction machines, connected rigidly to the diesel motor, and instead can be regulated by the control unit on a situation-by-situation basis depending on the operation-specific data. As a result, the desired and required target fan rotational speed can be optimally adjusted to the operating state of the construction machine.

It is also to be expected that due to the operation-related control of the electric motor or of the fan coupled to the said electric motor, these components will have an improved life expectancy, thereby reducing the operational costs of the construction machine.

In an advantageous embodiment of the invention, a load factor and/or a rotational speed of the drive unit can be registered by the control unit as operation-specific data. The load factor can, for example, be provided for the purpose of describing an operating state of the construction machine, such as a paving run, a transport run or a run during the moving of the construction machine on the paving field. On the other hand, the drive unit describes the momentary diesel motor rotational speed of the drive unit, which can rise or fall during the use of the construction machine. The registering of the load factor, for example, of the rotational speed of the drive unit, by the control unit is made possible by means of a functional connection of this control unit to the drive unit. Above all, this offers the technical advantage that operation-specific data of the drive unit, namely the load factor and/or the diesel motor rotational speed, can be registered at any time during the operation of the construction machine in order to adjust the desired fan target rotational speed on the basis of this information.

In a further embodiment of the invention, the control unit is configured for the purpose of registering an intake temperature and/or an ambient temperature of the construction machine, as operation specific data. To register the intake temperature and/or the ambient temperature, instruments can be provided that are connected functionally to the controller in such a way that the temperatures registered by the controller are taken into account in the calculation of the desired target fan rotational speed. By means of registering the intake temperature or ambient temperature, it is possible to optimise the fan operation according to the weather conditions.

It is also advantageous if the control unit is configured for the purpose of registering as operation-specific data the temperatures of the charge air, the cooling air and/or the hydraulic oil of the construction machine. During the operation of the construction machine, it is particularly important to maintain these operating media, namely the charge air, cooling air, and hydraulic oil, at a particular temperature in order for the supplied assemblies to function smoothly. Depending on the temperature specification of the operating media, the fan can be regulated by the controller in such a way that the operating media, namely the charge air, cooling air and/or hydraulic oil, are maintained at the specified temperature. As a result, the operation of the construction machine can be improved.

In order to determine the desired target fan rotational speed, preferably at least one mapping is provided for the control unit. The mapping is formed for the purpose of determining the desired target fan rotational speed on the basis of the operation-specific data in order, based on this target fan rotational speed, to carry out the driving of the electric motor by means of the control unit. The mapping offers a simple solution for the control unit to determine the desired target fan rotational speed. By using a plurality of mappings, different operating states of the construction machine can be regulated with specific ventilation adapted to them.

The control unit is preferably configured for the purpose of activating a predetermined mapping in light of the rotational speed of the drive unit, in order thereby to determine the target fan rotational speed. As a result, a preliminary selection of the mapping best suited for calculating the target fan rotational speed can be made in order to adapt the fan rotational speed specially to the current operating state of the construction machine.

In an embodiment of the invention, the control unit is configured such that the target fan rotational speed can be determined on the basis of the activated mapping, in that the mapping determines the target fan rotational speed in light of the load factor of the drive unit and in light of the ambient temperature. This offers the technical advantage that both specific data of the surroundings of the construction machine and specific data of the actual operation of the drive unit are taken into consideration for calculating the target fan rotational speed.

Alternatively to this, in a further embodiment of the invention it is provided that the control unit is configured for the purpose of determining the target fan rotational speed by means of the predetermined mapping in light of the charge air, cooling air and/or hydraulic oil temperature. The determination of the target fan rotational speed can thereby take place by means of any combination of the operating temperatures, namely, of the charge air, cooling air and/or hydraulic oil temperature. The operating media can consequently be maintained at the required operating temperature on the basis of the mapping calculation of the target fan rotational speed in this regard, because they are correspondingly supplied with a cooling airflow by the fan.

In order to bring the fan to the desired target fan rotational speed, a corresponding supply voltage must be applied to the electric motor. It is therefore preferably to be provided that the control unit comprises power electronics that supply the electric motor with a particular, changeable voltage in light of the determined target fan rotational speed. The power electronics thus ensure that a sufficient power supply of the electric motor is brought about in order to bring the fan to the target fan rotational speed obtained, e.g., by means of the previously mentioned mapping calculation.

In a further embodiment of the invention, the control unit comprises instruments that are formed for the purpose of subjecting each of the operation-specific data registered by the control unit to averaging. This is then advantageous if the electric motor is to be prevented from being driven too frequently by the control unit, which could make the response behaviour of the fan hectic. By means of these instruments of the control unit provided for averaging, it is possible to register operation-specific data during a predetermined time period during the paving run in order to calculate an averaged registered quantity that can be taken for the fan regulation. On the basis of the averaging by the control unit, it is likewise possible to reduce the computing effort such that the control unit does not run the risk of heating up.

It would be advantageous to form the control unit for the purpose of registering operation-specific data at a sampling rate of at least 2, preferably at least 20 values within at least a second in order to form the averaged value from them. This means that at least 20 operation-specific pieces of data of the same kind are enlisted for averaging within a predetermined time interval. Particularly advantageous would be if the control unit is formed for the purpose of registering the respective operation-specific data in second intervals, whereby a total of at least twenty pieces of the respective registered data is enlisted for averaging each time. As a result, it is possible to regulate the fan in such a way that no hectic regulation occurs, whereby the noise development during operation can likewise be reduced.

In order to prevent an abrupt change from one target fan rotational speed to a newly calculated target fan rotational speed, it is preferably provided that the control unit comprises an instrument for attenuation that is formed for the purpose of adjusting the target fan rotational speed slowly. The instrument for attenuation could, for example, comprise a ramp function by means of which a slow increase in the target fan rotational speed can be achieved. The instrument for attenuation or the ramp function specifies a gradient by means of which a stepwise, selective adjustment of the target rotational speed is possible. The gradient of the ramp function is thereby flat in such a way that the operation of the paver does not get the impression of a jump in the rotational speed. On the other hand, the gradient of the ramp function is steep enough that there is a rapid adjustment to the fan rotational speed in order to counteract overheating of the cooling system. In a particularly advantageous embodiment of the invention, it is provided that the gradient of the ramp function lies in a range from 0.1 revolutions per second to 200 revolutions per second, whereby the gradient is preferably roughly 12 revolutions per second. In this way, the fan function can be optimised.

In a further embodiment of the invention, it is provided that the control unit comprises memory that is formed for the purpose of storing particular operation-specific data during the operation of the construction machine. Furthermore, the memory can selectively store intermediate results of calculation steps within the controller. The values stored by the memory can, for example, be retrieved in the case of certain operating states of the construction machine, as a result of which swift calculation of the target fan rotational speed is possible.

The cooling unit preferably comprises a sensor that registers the actual fan rotational speed and forwards this information to the control unit. In this way, it is possible to monitor the operation of the fan.

The invention also relates to a method for the automatic regulation and control of a cooling system of a construction machine. For this purpose, a control unit is provided that registers operation-specific data of the construction machine and that determines, on the basis of these data, a desired target fan rotational speed. In reaction to this, the control unit supplies an electric motor that is provided for the cooling system with a voltage that is provided in such a way that a fan connected to the electric motor reaches the desired target fan rotational speed.

An embodiment of the invention is illustrated by FIG. 1. FIG. 1 shows a schematic configuration of the construction machine 1, such as it is provided according to the invention.

The construction machine 1 can be a road paver or a feeder. The construction machine 1 comprises a drive unit 80 that is connected to a pump transfer gear 81. The drive unit is additionally connected functionally to a control unit 60. The dashed arrows 130, 140 thereby indicate that the control unit 60 can register a load factor as well as the rotational speed of the drive unit.

The control unit is furthermore connected functionally to a cooling unit 3. The cooling unit 3 comprises an electric motor 90 as well as a fan 70 that is coupled to the electric motor 90.

A dotted line 120 is used to indicate that a power supply runs from the control unit 60 to the electric motor 90. The dashed arrow 100 that runs from the electric motor 90 to the control unit 60 makes it clear that an actual fan rotational speed can be registered by the control unit 60.

The control unit 60 is likewise formed for the purpose of registering temperatures of a charge air 30 and a cooling air 40 and the temperature of the hydraulic oil 50. The temperature registration of the charge air 30, the cooling air 40 and the hydraulic oil 50 is depicted by means of dashed lines 31, 41, 51, which run in the direction of the control unit 60. A dashed arrowed line 21 indicates that the control unit 60 can register an ambient temperature 10 as well as an intake temperature 20.

The control unit 60 comprises at least one mapping 150 which is formed for the purpose of determining the desired target fan rotational speed, for example, on the basis of the correlation of the load factor and the ambient temperature or intake temperature. In the presence of a plurality of mappings 150, it is provided that a corresponding mapping 150 can be activated depending on the diesel motor rotational speed.

The control unit 60 furthermore comprises an instrument 300 that is provided selectively for an averaging of the registered specific data 2. The registered specific data 2 can comprise the load factor, the diesel motor rotational speed, the charge air temperature, the cooling air temperature, the hydraulic oil temperature, the ambient temperature and/or the intake temperature.

By means of the instrument 300 for averaging, the control unit 60 registers a plurality of values of each measured value at a sampling rate of from 2 to 1000 values within ten milliseconds to 360 seconds. An average value is formed from the registered values. The registration preferably takes place at a sampling rate of at least 20 values within at least one second. This prevents fast short and large load jumps from being reflected in the fan rotational speed and the creation of unpleasant noise fluctuations during operation. It is also provided that the instrument 300 is formed to carry out alternative averaging by means of a sliding average, geometric average, harmonic average, quadratic average or cubic average.

The control unit furthermore comprises an instrument for attenuation 240. In this way, possible rotational speed jumps on the fan 70 can be attenuated by means of a ramp function provided for the instrument 240. The instrument for attenuation 240 is configured for the purpose of carrying out a stepwise adjustment of the actual fan rotational speed until the target fan rotational speed is reached. The stepwise adjustment of the target fan rotational speed takes place by means of a defined gradient that is specified for the instrument for attenuation 240. The gradient of the instrument 240, meaning the ramp function, should be so flat that the operator of the construction machine does not have the impression of a jump in the rotational speed. On the other hand, the gradient is present to such an extent that the target fan rotational speed rises quickly enough to prevent overheating of the cooling system 3. A ramp gradient between 0.1 and 200 revolutions per second is conceivable, whereby preferably a gradient of roughly 12 revolutions per second is given.

Memory 160 is furthermore provided for the control unit 60. The operation-specific data can be stored in the memory 160, whereby the storage of intermediate results of calculation steps within the controller 60 is also selectively possible in the memory 160.

Finally, the control unit 60 comprises power electronics 110. The power electronics 110 are configured for the purpose of ensuring a supply voltage, meaning a power supply for the electric motor 90. The magnitude of the supply voltage that is provided to the electric motor by the power electronics 110 depends on the determined target fan rotational speed.

Road pavers require the maximum cooling air volume flow only in extreme working conditions with very high ambient temperatures and very high motor capacity utilisation. This operating state rarely arises, however, so that the target fan rotational speed can be reduced for a multitude of application cases and consequently can lead to reduced noise on the road paver. If the fan 70 is not operated at the maximum design point of the paver 1, the reduced target fan rotational speed allows fuel to be saved. Compared to a hydraulically driven fan, the fan drive according to the invention with the electric motor 90 has a better overall degree of efficiency.

The invention likewise offers the technical advantage that the target fan rotational speed can be determined depending on the load factor and the ambient temperature 10, as a result of which a fast response time of the fan 70 is possible in order to prevent the machine from overheating. Because the load factor and the ambient temperature 10 are already present at a point in time during the heating-up process of the cooling media 30, 40, 50, the target fan rotational speed can be adjusted before a temperature rise in the cooling unit 3. Dead times are consequently bypassed, because the correct cooling airflow can be adjusted by the cooler 70 before a possible overheating. This is possible with the electric motor 90 provided specially for the cooling unit independently of the current diesel motor rotational speed of the drive unit 80.

Due to the fact that the fan 70 does not have to be positioned close to the drive shaft of the drive unit 80, as is the case for directly driven fans, the position of the cooling unit 3, particularly of the fan 70, can be selected freely within the construction machine 1.

Particularly with regard to the increasingly intensified constructed space issues caused by complex exhaust gas aftertreatment systems, it is advantageous not to be tied to fixed positions within the construction machine 1 for the arrangement of the cooling unit 3.

As has already been described, a plurality of fans 70 can be provided for the cooling unit 3, whereby each can be driven by a plurality of electric motors 90. With a plurality of electrically driven fans 70, it is consequently possible to separately control the temperature of the media that are to be cooled, for example, separately control the temperature of the charge air, cooling air and/or hydraulic oil, according to their respective individual cooing air requirements.

In addition, it would be conceivable to implement diagnostic functions in the control unit. If it should come about that the temperatures cannot be registered correctly, this could make it possible to avoid overheating of the construction machine 1. For example, the function of the temperature sensors could be diagnosed.

The invention relates to a construction machine with an improved cooling air supply so that no overheating of the construction machine occurs. The cooling unit 3 can thereby be driven according to the situation, conditional on operation-specific data 2. At least one electric motor is provided specially for the cooling unit 3, whereby said electric motor ensures an efficient and economical solution in order to provide the required cooling airflow by means of the coupled fan 70.

The invention claimed is:

1. Road paver or feeder with automatic fan rotational speed regulation comprising a drive unit, a control unit configured for the purpose of registering operation-specific data and, a cooling unit that comprises at least one fan in order to produce a cooling airflow wherein the cooling unit comprises at least one regulatable electric motor that is functionally connected to the at least one fan, the electric motor not being coupled with the drive unit, the control unit being configured for the purpose of regulating based on specific operating data of the road paver or feeder an electric output of the respective electric motor in order to adjust a desired target fan rotational speed on the at least one fan and wherein the control unit comprises an instrument that is formed for the purpose of registering a load factor and/or a rotational speed of the drive unit by means of the operation-specific data and subjecting the load factor and/or rotational speed of the drive unit registered by means of the control unit to averaging, wherein the control unit comprises a plurality of mappings which are provided for determining the target fan rotational speed, wherein based on the rotational speed of the drive unit, the control unit is configured for the purpose of selecting a predetermined mapping among the plurality of mappings in order to determine the target fan rotational speed, and wherein the selected mapping determines the target fan rotational speed in light of the load factor of the drive unit and in light of the ambient temperature.

2. Road paver or feeder according to claim 1, wherein the control unit comprises power electronics that supply the electric motor with a predetermined voltage in light of-a determined target fan rotational speed.

3. Road paver or feeder according to claim 2, wherein the instrument is formed for the purpose of registering at least ten operation-specific data in order to form an average.

4. Road paver or feeder according to claim 1, wherein the control unit is configured for the purpose of registering at least one of a charge air temperature, cooling air temperature and/or hydraulic oil temperature in response to receipt of the operation-specific data.

5. Road paver or feeder according to claim 1, wherein the control unit is configured for the purpose of registering an intake temperature and/or an ambient temperature of the road paver or feeder by means of the operation-specific data.

6. Road paver or feeder according to claim 1 wherein the control unit comprises an instrument for attenuation that is formed for the purpose of adjusting the target fan rotational speed smoothly, without steps.

7. Road paver or feeder according to claim 1, wherein the control unit is configured to determine the target fan rotational speed based on the predetermined mapping in light of particular operation-specific data.

8. Road paver or feeder according to claim 1, wherein the control unit determines the target fan rotational speed by means of the predetermined mapping in light of the charge air temperature, cooling air temperature or hydraulic oil temperature.

9. Road paver or feeder according to claim 1, that the control unit comprises a memory that is formed for the purpose of storing particular operation-specific data during the operation of the road paver or feeder.

10. Road paver or feeder according to claim 1, wherein the cooling unit comprises a sensor that is formed for the purpose of registering the actual fan rotational speed and forwarding this to the control unit.

11. Method for the automatic regulation and control of a cooling system of a road paver or feeder having a drive unit which comprises providing a control unit that is configured to registers a load factor and/or a rotational speed of the drive unit by means of operation-specific data of the road paver or feeder subjecting the load factor and/or a rotational speed of the drive unit registered by the control unit to averaging, determining based on the registered data a desired target fan rotational speed, supplying from the control unit an electric motor that is provided for the cooling system and being decoupled from the drive unit, with a regulatable voltage in order to achieve the desired target fan rotational speed on a fan connected to the electric motor, selecting a predetermined mapping from a plurality of mappings of the control unit based on a rotational speed of the drive unit in order to determine the target fan rotational speed, and determining by the selected predetermined mapping the target fan rotational speed in light of the load factor of the drive unit and in light of the ambient temperature.

12. Road paver or feeder with automatic fan rotational speed regulation comprising a drive unit, a control unit configured for the purpose of registering operation-specific data and, a cooling unit that comprises at least one fan in order to produce a cooling airflow wherein the cooling unit comprises at least one regulatable electric motor that is functionally connected to the at least one fan, and decoupled from the drive unit, the control unit comprising a plurality of mappings provided for determining a target fan rotational speed and selecting, based on-a rotational speed of the drive unit, one of the plurality of mappings, and the control unit using the selected mapping for determining the target fan rotational fan speed of the-cooling unit and for regulating, based on specific operating data of the-road paver or feeder, an electric output of the respective electric motor that adjusts the desired target fan rotational speed on the at least one fan, wherein the selected mapping determines the target fan rotational speed in light of the load factor of the drive unit and in light of the ambient temperature, and wherein the control unit registers operation specific data of the-road paver or feeder and subjects the operation specific data registered by the control unit to averaging.

13. Method for the automatic regulation and control of a cooling system of a road paving machine or feeder having a drive unit, the road paving machine or feeder further comprising:

a drive unit,-the method comprising collecting and registering in a control unit operation specific data including load factor and/or the rotational speed of the drive unit based on the performance of the road paving machine or feeder, cooling the operational specific components of the road paving machine or feeder with a cooling fan being connected with an adjustable speed electric motor, the electric motor being decoupled from the drive unit, regulating-an electric output of the respective electric motor in response to operation specific data collected and registered by the control unit to set the rotational speed of the fan to a speed corresponding to the operation specific data on the performance of the road paving machine or feeder, the control unit comprising an instrument that is formed for the purpose of subjecting the load factor and/or the rotational speed of the drive unit registered by means of the control unit to averaging and a plurality of mappings provided for determining a target fan rotational speed and configuring the control unit based on the rotational speed of the drive unit for the purpose of selecting a predetermined mapping of the plurality of mappings and using the selected mapping in order to determine the target fan rotational speed for the at least one fan, determining by the selected predetermined mapping the target fan rotational speed in light of the load factor of the drive unit and in light of the ambient temperature, and regulating, based on specific operating data of the road paver or feeder, an electric output of the respective electric motor that adjusts the desired target fan rotational speed on the at least one fan and wherein the control unit registers operation specific data of the road paver or feeder and subjects the operation specific data registered by the control unit to averaging.

14. Road paver or feeder with automatic fan rotational speed regulation comprising a drive unit, a control unit configured for the purpose of registering operation-specific data and, a cooling unit that comprises at least one fan that produces an airflow for cooling hydraulic oil, the cooling unit comprises at least one regulatable electric motor that is functionally connected to the at least one fan, and decoupled from the drive unit, the control unit comprising a plurality of mappings provided for determining a target fan rotational speed and selecting, based on-a rotational speed of the drive unit, one of the plurality of mappings, and the control unit using the selected mapping for determining the target fan rotational fan speed of the-cooling unit which is determined by the selected mapping in light of the load factor of the drive unit and in light of the ambient temperature, and for regulating, based on specific operating data of the-road paver or feeder, an electric output of the respective electric motor that adjusts the desired target fan rotational speed on the at least one fan and wherein the control unit registers operation specific data of the-road paver or feeder and subjects the operation specific data registered by the control unit to averaging.

15. Method for the automatic regulation and control of a cooling system of a road paver or feeder having a drive unit which comprises providing a control unit that is configured to register a load factor and/or a rotational speed of the drive unit by means of operation-specific data of the road paver or feeder subjecting the load factor and/or a rotational speed of the drive unit registered by the control unit to averaging, producing a cooling airflow with a fan connected to an electric motor for cooling hydraulic oil used for operation of the road paver or feeder determining based on the registered data a desired target rotational speed for the fan, and supplying the electric motor from the control unit with a regulatable voltage to achieve the desired target fan rotational speed on the fan, the electric motor being provided for the cooling system and decoupled from the drive unit, selecting a predetermined mapping from a plurality of mappings of the control unit based on a rotational speed of the drive unit in order to determine the target fan rotational speed, and determining by the selected predetermined mapping the target fan rotational speed in light of the load factor of the drive unit and in light of the ambient temperature.

\* \* \* \* \*